US008865257B2

(12) United States Patent
Sulzer et al.

(10) Patent No.: US 8,865,257 B2
(45) Date of Patent: *Oct. 21, 2014

(54) IN-LINE MEASURING DEVICE WITH MEASURING TUBE LINED INTERNALLY WITH POLYURETHANE AND METHOD FOR MANUFACTURE THEREOF

(75) Inventors: Thomas Sulzer, Grenzach-Wyhlen (DE); Johannes Ruchel, Arlesheim (CH); Alexander Stuenzi, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 1049 days.

This patent is subject to a terminal disclaimer.

(21) Appl. No.: 12/385,171

(22) Filed: Apr. 1, 2009

(65) Prior Publication Data
US 2009/0214774 A1 Aug. 27, 2009

Related U.S. Application Data

(62) Division of application No. 11/806,712, filed on Jun. 4, 2007, now Pat. No. 7,523,674.

(60) Provisional application No. 60/810,170, filed on Jun. 2, 2006, provisional application No. 60/810,171, filed on Jun. 2, 2006.

(30) Foreign Application Priority Data

Jun. 2, 2006 (DE) .......................... 10 2006 026 310
Jun. 2, 2006 (DE) .......................... 10 2006 026 311

(51) Int. Cl.
*B05D 7/22* (2006.01)
*G01F 1/58* (2006.01)

(52) U.S. Cl.
CPC ... *G01F 1/58* (2013.01); *B05D 7/22* (2013.01)
USPC .......................................... 427/236; 427/239

(58) Field of Classification Search
CPC .................................... G01F 1/58; B05D 7/22
USPC ........... 427/230–239; 118/317–318, DIG. 10, 118/DIG. 13; 138/146
See application file for complete search history.

(56) References Cited

U.S. PATENT DOCUMENTS

| 3,695,104 | A | 10/1972 | Mannherz et al. ......... 73/861.12 |
| 4,274,887 | A | 6/1981 | Pogoda ........................ 428/414 |
| 4,279,166 | A | 7/1981 | Gryn et al. ................. 73/861.12 |
| 4,297,895 | A | 11/1981 | Gryn ......................... 73/861.12 |
| 4,297,896 | A | 11/1981 | May .......................... 73/861.12 |
| 4,297,897 | A | 11/1981 | Young ........................ 73/861.12 |
| 4,398,346 | A * | 8/1983 | Underhill et al. ............ 29/623.5 |
| 4,774,844 | A | 10/1988 | Davis |
| 5,178,252 | A | 1/1993 | Smith ............................... 193/5 |
| 5,776,548 | A | 7/1998 | Rukavina et al. ......... 427/407.1 |
| 5,863,964 | A | 1/1999 | Teumac et al. ............... 523/100 |
| 6,057,002 | A | 5/2000 | Robinson et al. ............ 427/409 |
| 6,080,254 | A | 6/2000 | Draper et al. .................... 156/71 |
| 6,110,327 | A | 8/2000 | Rukavina et al. .......... 204/192.1 |
| 6,611,770 | B1 | 8/2003 | O'Donnell et al. ............. 702/49 |
| 7,523,674 | B2 * | 4/2009 | Sulzer et al. ............... 73/861.12 |
| 2002/0114955 | A1 | 8/2002 | Lamers |
| 2005/0126305 | A1 | 6/2005 | Schulz et al. .............. 73/861.12 |
| 2006/0162465 | A1 * | 7/2006 | Sulzer et al. ............... 73/861.12 |
| 2006/0272427 | A1 | 12/2006 | Zingg et al. ................ 73/861.12 |
| 2007/0093633 | A1 | 4/2007 | Brobeil et al. .................. 528/44 |

FOREIGN PATENT DOCUMENTS

| DE | 30 11 510 A1 | 10/1981 |
| DE | 103 58 268 A1 | 7/2005 |
| DE | 10 2004 047 921 | 4/2006 |
| DE | 10 2004 062 680 A1 | 6/2006 |
| EP | 0 409 300 A2 | 1/1991 |
| EP | 0 770 856 A2 | 5/1997 |
| EP | 1 178 080 A2 | 2/2002 |
| JP | 522 0451 | 8/1993 |
| WO | WO 00/48806 A1 * | 8/2000 |

OTHER PUBLICATIONS

Oertel, Gunter, Polyurethane, Kunststoff-Handbuch, 3, Aufl., 1993, pp. 104-109.

* cited by examiner

*Primary Examiner* — William Phillip Fletcher, III
(74) *Attorney, Agent, or Firm* — Bacon & Thomas, PLLC

(57) ABSTRACT

The measuring tube of an in-line measuring device is formed by means of a support tube and a liner internally lining the support tube. The liner adheres to the support tube, with interposition of a mediating primer. Both the primer and the liner are composed, at least in part, of polyurethane. Especially, both the polyurethane of the liner and also the polyurethane of the primer are suitable for drinking water applications, so that the in-line measuring device itself is also suited for measuring drinking water.

15 Claims, 1 Drawing Sheet

IN-LINE MEASURING DEVICE WITH MEASURING TUBE LINED INTERNALLY WITH POLYURETHANE AND METHOD FOR MANUFACTURE THEREOF

CROSS-REFERENCE TO RELATED APPLICATION

This application is a Divisional of U.S. patent application Ser. No. 11/806,712 filed on Jun. 4, 2007 and now U.S. Pat. No. 7,523,674 B2; which is a nonprovisional which claims the benefit of U.S. Application Ser. No. 60/810,170 filed on Jun. 2, 2006 and Ser. No. 60/810,171 filed on Jun. 2, 2006, and priority is claiming German application 10 2006 026 310.3 filed on Jun. 2, 2006 and German application 10 2006 026311.1 filed on Jun. 2, 2006.

FIELD OF THE INVENTION

The invention relates to an in-line measuring device, especially a flow measuring device for measuring a fluid flowing in a pipeline, wherein the in-line measuring device includes a measuring transducer, or pickup, especially a magneto-inductive measuring transducer, having a measuring tube inserted into the course of the pipeline for conveying the fluid to be measured and lined internally with a liner, and wherein the liner is made of a polyurethane produced using a catalyst containing metal-organic compounds. Further, the invention relates to a method for manufacturing the aforementioned in-line measuring device.

BACKGROUND OF THE INVENTION

It is known to use in-line measuring devices containing a magneto-inductive measuring transducer to measure the flow velocity and/or volume flow, e.g. volume flow rate, of an electrically conductive fluid flowing in a stream direction through a measuring tube of the measuring transducer. For this, the magnetically inductive transducer uses, most often, diametrically opposed field coils of a magnetic circuit arrangement electrically connected to an exciter electronics of the in-line measuring device, to produce a magnetic field, which passes through the fluid within a given measuring volume at least sectionally perpendicularly to the direction of flow and that closes on itself essentially outside of the fluid. The measuring tube is made, in such case, usually of non-ferromagnetic material, so that the magnetic field is not unfavorably affected during measurement. Due to the movement of free charge carriers of the fluid in the magnetic field, an electric field is produced in the measuring volume, on the basis of the magneto-hydrodynamic principle. The electric field is directed perpendicularly to the magnetic field and perpendicularly to the direction of flow of the liquid. An electric voltage induced in the fluid is, therefore, measurable by means of at least two measuring electrodes arranged spaced from one another in the direction of the electric field, and by means of an evaluation electronics of the in-line measuring device connected to these electrodes. The induced voltage is, in turn, a measure for the volume flow rate. Fluid-contacting, galvanic, or fluid-non-contacting, capacitive, measuring electrodes can serve, for instance, to sense the induced voltage. For guiding and coupling the magnetic field into the measurement volume, the magnetic circuit arrangement generally includes coil cores surrounded by the field coils. The coil cores are separated from each other, especially diametrically, along a periphery of the measuring tube, and are arranged each with a free end face front surface, especially at positions where they are, in effect, mirror images of one another. In operation, the magnetic field created by the field coils connected to the exciter-electronics is so coupled via the coil cores into the measuring tube, that it passes through the fluid flowing between the two end faces at least sectionally perpendicularly to the stream direction.

Often used as an alternative to in-line measuring devices with magneto-inductive measuring transducers are in-line measuring devices that measure flow velocities and/or volume flow, e.g. flow rates, acoustically by means of ultrasonics, with a corresponding ultrasound transmitter- and receiver-equipped, measuring tube.

Due to the high mechanical stability demanded for such measuring tubes, these—both for magneto-inductive, as well as for acoustically measuring, transducers—comprise most often an outer, especially metal, support tube of predetermined strength and diameter, coated internally with an electrically non-conductive, insulating material of predetermined thickness, the so-called liner. For example, U.S. Pat. No. 6,595,069, U.S. Pat. No. 5,664,315, U.S. Pat. No. 5,280,727, U.S. Pat. No. 4,679,442, U.S. Pat. No. 4,253,340, U.S. Pat. No. 3,213,685 or JP-Y 53-51 181 describe magneto-inductive measuring transducers, which include a measuring tube insertable fluid-tightly into a pipeline. The measuring tube, which has a first, inlet end and a second, outlet end, is comprised of a non-ferromagnetic support tube, serving as an outer casing of the measuring tube, and a tubular liner accommodated in a lumen of the support tube. The liner, which is made of an insulating material, serves to convey a flowing liquid insulated from the support tube.

The liner, which usually is made of a thermoplastic, thermosetting or elastomeric, synthetic material, or plastic, serves to isolate the support tube chemically from the fluid. In the case of magneto-inductive measuring transducers equipped with a support tube having a high electrical conductivity, for example through the use of metallic support tubes, the liner serves also as electrical isolation, or insulation, between the support tube and the fluid, for preventing a short circuiting of the electrical field through the support tube. By suitable design of the support tube, it is thus possible to match the strength of the measuring tube to the mechanical loads in particular cases of application, while an adapting of the measuring tube to the chemical and/or biological requirements of particular applications can be realized by means of the liner.

Because of its good working characteristics on the one hand, and its good chemical and mechanical properties on the other hand, polyurethane, in particular, has, alongside hard rubber or fluorine-containing synthetic materials such as PTFE, PFA, also become established as a material for liners of in-line measuring devices, especially those with magneto-inductive measuring transducers.

The polyurethanes used for the production of the described liners are mostly elastomeric plastics, that are made on the basis of liquid, multicomponent systems formed, directly before their processing, of reactive starting components. Following mixing, such a multicomponent system is applied onto the inner wall of the support tube pretreated, if necessary, with an adhesion promoter, the so-called primer, and left there to cure to form the liner within a predeterminable reaction time. A paintable or coating plastic, for example a synthetic resin lacquer, an alkyd resin lacquer, an acrylic paint, a dispersion paint, a silicate paint, an epoxy resin or the like, can serve as primer.

It is well known that polyurethanes are made by the poly-addition method from di- and poly-isocyanates and di-, or more-, valent alcohols. The starting components can, in such case, be, for example, prepolymers, composed of aliphatic and/or aromatic ether- and/or ester-groups, as well as glycol-, and isocyanate-, groups that can correspondingly react with the supplied, di-, or more-, valent, alcohol. If necessary, beyond that, powdery or pasty, if necessary also colorant, fillers, such as carbonates, silicates, soot, pigments, or reactive coloring materials, are mixed in.

Often used to manufacture liners of polyurethane is a so-called ribbon flow method, in which a previously prepared, liquid, multicomponent system is evenly distributed on the suitably moving, pre-treated if necessary, inner wall of the support tube by an appropriate pour-, or spray-, head. The reaction time required for the subsequent curing of the multicomponent system can be set by the dosage of the starting components, and, also, to a large extent by a suitable controlling of the processing temperature. However, short reaction times of less than a minute, which are necessary for cost-effective production of the liner, at a processing temperature of about room temperature, are obtained usually only through addition of a suitable catalyst, usually a heavy metal, and/or amine-containing, catalyst, to the multicomponent system. Here, especially tertiary amines and/or mercury are used as catalysts.

Considering that the catalyst itself remains essentially unchanged in the finished polyurethane, the latter has then, as a result, inevitably also toxic, or at least physiologically not completely harmless, characteristics. Numerous investigations have also shown, that, especially the catalyst, can, to a significant degree, be dissolved, or leached, out of the liner, at least in the presence of water. The same is also generally to be considered true for possibly unreacted remainders of one or the other starting component or also reaction intermediate- or reaction by-products.

As a result, the polyurethanes used at present in in-line measuring devices are only suitable conditionally for applications with high hygienic requirements, e.g. for measurements in the field of drinking water, since the high requirements for fluid-touching components in the drinking water field with regard to chemical stability as well as physiological compatibility, cannot, without more, be fulfilled. Rather, comparatively expensive liners of PFA, PTFE or hard rubber are, therefore, used in the field of drinking water.

In the drinking water field, special attention is paid to, among other things, adherence to the maximally tolerable migration rate ($M_{max, TOC}$) with regard to total organic carbon (TOC) content and/or the specific migration limit (SML) values defined for toxicologically critical substances. Equally strict are the requirements regarding the effect of the liner on the aesthetic condition of drinking water, especially regarding taste-, color-, turbidity-, and/or smell-neutrality of the liner in the presence of water, as well as regarding maximally tolerable chlorine consumption rates ($M_{max, Cl}$).

Considering that it is not possible, without more, to preclude out-diffusing, and/or dissolution, or leaching, resulting from possible damage to the liner, of also deeper-lying constituents of the particularly applied plastic into the measured fluid over the total operating time of the inline measuring device, at least for applications in the drinking water field, not only the liner contacted by the fluid during operation, but, also, the primer possibly used for mediating between support tube and liner, must fulfill the same, strict requirements.

SUMMARY OF THE INVENTION

An object of the invention is to provide an in-line measuring device, especially one with a magneto-inductive measuring transducer, having a liner internally lining its measuring tube, which liner has good physiological, organo-leptic and bacteriological characteristics. In addition, the in-line measuring device, despite using polyurethane as material for the liner, should be accessible to as extensively diverse application areas as possible, especially also in the drinking water field. Accordingly, the measuring transducer, especially also its measuring tube, should also be able to meet the high chemical-biological and hygienic requirements set for drinking water applications.

To achieve the object, the invention provides an in-line measuring device, especially a flow measuring device, for measuring a fluid flowing in a pipeline, which in-line measuring device includes a measuring transducer, especially a magneto-inductive or acoustic, measuring transducer, that includes a measuring tube inserted into the course of the pipeline for conveying the fluid to be measured, and formed by means of a support tube, especially a metal support tube, as well as by means of a liner internally-lining the support tube, wherein the support tube and liner adhere together with interposition of a mediating primer, and wherein liner and primer each is composed, at least in part, of polyurethane, especially polyurethane suitable for drinking water applications.

Moreover, the invention resides in a method for manufacturing a measuring tube for an in-line measuring device, especially an in-line measuring device as defined herein, wherein the measuring tube has a support tube as well as a liner which lines the support tube, which method includes the following steps:

Forming a flowable, especially sprayable and/or brushable, first multicomponent system, that contains isocynate, especially di-isocynate, as well as a di-, or more-, valent alcohol, applying the first multicomponent system on an inner wall of a support tube, especially a metal support tube, serving as a component of the measuring tube, curing at least portions of the first multicomponent system on the inner wall of the support tube to form a primer adhering to the support tube, forming a flowable, second multicomponent system containing isocynate, especially di-isocynate, a di-, or more-, valent alcohol, and a catalyst, applying the second multicomponent system onto the primer formed on the inner wall of the support tube, and curing the second multicomponent system in the support tube to form the liner.

Additionally, it is provided that the aforementioned in-line measuring device, especially one manufactured according to the method of the invention, is used for measuring flow, e.g. flow rate, and/or a flow velocity of water, especially drinking water, flowing in a pipeline.

In a first embodiment of the in-line measuring device of the invention, it is provided that the polyurethane of the liner and the polyurethane of the primer are different.

In a second embodiment of the in-line measuring device of the invention, it is provided that the liner and primer are made of essentially equal, e.g. the same, polyurethanes.

In a third embodiment of the in-line measuring device of the invention, it is provided that polyurethanes suitable for drinking water are used for both the liner and the primer.

In a fourth embodiment of the in-line measuring device of the invention, it is provided that the polyurethane of the liner and/or the polyurethane of the primer contain/contains aromatic and/or aliphatic compounds.

In a fifth embodiment of the in-line measuring device of the invention, it is provided that the polyurethane of the liner and/or the polyurethane of the primer contain/contains ether groups, especially aliphatic ether groups.

In a sixth embodiment of the in-line measuring device of the invention, it is provided that the polyurethane of the liner and/or the polyurethane of the primer contain/contains ester groups, especially aliphatic ester groups.

In a seventh embodiment of the in-line measuring device of the invention, it is provided that at least the polyurethane of the liner is manufactured using a catalyst containing metal-organic compounds.

In an eighth embodiment of the in-line measuring device of the invention, it is provided that, for manufacture of the liner, a catalyst is used, whose metal, possibly introduced by it into the liner and remaining there, is bonded chemically, especially atomically, and/or physically, to carbon chains formed in the liner.

In a ninth embodiment of the in-line measuring device of the invention, it is provided that the catalyst used at least for manufacture of the polyurethane of the liner contains tin and the liner contains organically, especially aliphatically, bonded tin.

In a tenth embodiment of the in-line measuring device of the invention, it is provided that the catalyst used at least for manufacture of the polyurethane of the liner is essentially free of heavy metals.

In an eleventh embodiment of the in-line measuring device of the invention, it is provided that the catalyst used at least for manufacture of the polyurethane of the liner is essentially free of amines.

In a twelfth embodiment of the in-line measuring device of the invention, it is provided that also the polyurethane of the primer is manufactured using a catalyst containing metal-organic compounds.

In a thirteenth embodiment of the in-line measuring device of the invention, it is provided that the polyurethane of the liner and the polyurethane of the primer are manufactured using equal, e.g. the same, catalysts.

In a fourteenth embodiment of the in-line measuring device of the invention, it is provided that the polyurethane of the liner and/or the polyurethane of the primer are/is manufactured by means of at least one multicomponent system, which is formed on the basis of isocyanates, especially aromatic and/or aliphatic isocyanates, especially on the basis of diisocyanates, and di-, or more-, valent alcohol, especially a butanediol. In a further development of this embodiment of the in-line measuring device of the invention, it is provided that the at least one multicomponent system is formed on the basis of monomeric and/or prepolymeric and/or polymeric isocyanates. In another further development of this embodiment of the invention, it is further provided that the at least one multicomponent system is produced using diisocyanates, especially diphenylmethane diisocyanate (MDI), hexane diisocyanate (HDI), toluene diisocyanate (TDI) and/or isophorone diisocyanate (IPDI).

In a fifteenth embodiment of the in-line measuring device of the invention, it is provided that the polyurethane of the liner and/or the polyurethane of the primer are/is manufactured by means of at least one multicomponent system, which is formed on the basis of isocyanates, especially aromatic and/or aliphatic isocyanates, especially on the basis of diisocyanates, and di-, or more-, valent alcohol embodied as a prepolymer. In a further development of this embodiment of the in-line measuring device of the invention, it is provided that the alcohol is a prepolymer based on castor oil.

In a sixteenth embodiment of the in-line measuring device of the invention, it is provided that both the liner as well as also the primer are essentially free of heavy metals.

In a seventeenth embodiment of the in-line measuring device of the invention, it is provided that both the liner as well as also the primer are essentially free of amines.

In an eighteenth embodiment of the in-line measuring device of the invention, it is provided that the liner has a thickness of less than 8 mm, especially less than 4 mm.

In a nineteenth embodiment of the in-line measuring device of the invention, it is provided that the primer has a thickness of less than 500 µm, especially less than 300 µm.

In a twentieth embodiment of the in-line measuring device of the invention, it is provided that the measuring tube has a nominal diameter smaller than or equal to 2000 mm.

In a twenty-first embodiment of the in-line measuring device of the invention, it is provided that the measuring tube has a nominal diameter greater than or equal to 25 mm.

In a further development of the in-line measuring device of the invention, the measuring transducer includes a magnetic circuit arrangement arranged at the measuring tube for producing and guiding a magnetic field, which induces an electric field in the flowing fluid, and measuring electrodes for tapping electrical voltages induced in the flowing fluid.

In a first embodiment of the method of the invention, it is provided that the catalyst of the second multicomponent system contains metal-organic compounds, especially ones formed of a physiologically safe metal, such as e.g. organotin compounds or the like. In a further development of this embodiment of the method of the invention, it is provided that the catalyst of the second multicomponent system contains organotin compounds, especially di-n-octyl tin compounds. In another further development of this embodiment of the method of the invention, it is provided that the catalyst is a di-n-octyl tin dilaurate and/or a di-n-octyl tin dimalinate.

In a second embodiment of the method of the invention, it is provided that prepolymer of the first and/or second multicomponent system(s) contains at least two reactive NCO groups.

In a third embodiment of the method of the invention, it is provided that prepolymer of the first and/or second multicomponent system(s) contains aromatic and/or aliphatic isocyanate groups.

In a fourth embodiment of the method of the invention, it is provided that the first and/or the second multicomponent system contain/contains monomeric and/or prepolymeric and/or polymeric isocyanate.

In a fifth embodiment of the method of the invention, it is provided that the first and/or second multicomponent system(s) are/is formed using a prepolymer based on diisocyanate. In a further development of this embodiment of the method of the invention, it is provided that the prepolymer of the first and/or second multicomponent system(s) are/is formed on the basis of diphenylmethane diisocyanate (MDI), hexane diisocyanate (HDI), toluene diisocyanate (TDI) and/or isophorone diisocyanate (IPDI).

In a sixth embodiment of the method of the invention, it is provided that the first and/or second multicomponent system(s) contain/contains ether groups, especially aliphatic and/or aromatic ether groups and/or ester groups, especially aliphatic and/or aromatic ester groups.

In a seventh embodiment of the method of the invention, it is provided that the alcohol of the first and/or second multicomponent system(s) is a diol, especially a butanediol.

In an eighth embodiment of the method of the invention, it is provided that the alcohol of the first and/or second multicomponent system(s) is a prepolymer formed on the basis of castor oil.

In a ninth embodiment of the method of the invention, it is provided that also the first multicomponent system contains a catalyst. In a further development of this embodiment of the method of the invention, it is provided that the catalyst of the first multicomponent system contains metal-organic compounds, especially metal-organic compounds formed of physiologically safe metals, such as organotin compounds or the like. In another further development of this embodiment of the method of the invention, it is provided that the catalyst of the first multicomponent system contains organotin compounds, especially di-n-octyl tin compounds.

In a tenth embodiment of the method of the invention, the method is performed at a working temperature of less than 100° C., especially at about 25° C.

The invention rests, among other things, on the surprising discovery that liners and primers of polyurethane have, without reservation, also good biological properties, especially also in a bacteriological sense, and, as a result, can be quite suitable also for application in in-line measuring devices of the described kind provided for the measurement of aqueous fluids, especially also drinking water.

A basic idea of the invention is to use polyurethane suitable for drinking water both for manufacture of the liner, which may be composed of multiple layers, as well as also for the primer therebeneath, also possibly composed of multiple layers. This is achieved, especially, by using polyurethanes where monomer and/or metal residue(s) possibly remaining from the manufacture likewise have/has no unallowably high, adverse effects and/or diffusion rates for drinking water applications.

A further consideration in the invention is to use, at least for the liner, those polyurethanes manufactured by adding of a metal-organic catalyst, which is, however, free of amines and heavy metals. By using a catalyst based on metal-organic compounds, it is possible to achieve that metals introduced into the liner by way of the catalyst are bonded physically and/or chemically, especially atomically and/or by crosslinking, to carbon chains, and are, as a result, quite resistantly and permanently embedded in the polyurethane. As a result of this, it is assured that, if at all, only very small quantities of metals or metal compounds, in physiologically safe rates, are lost from the liner during operation of the in-line measuring device into the fluid to be measured. Additionally, it is possible, by using physiologically quite safe, non-heavy-metals for the catalyst, metals such as e.g. tin, to produce, also with reference to the used catalyst, a practically "intrinsically safe" polyurethane, by which can be assured that, even in the case of possible leaching of metals and/or metal compounds introduced with the catalyst, that at least no hygienically unacceptable contamination of the affected fluid is caused thereby.

An advantage of the invention is, among other things, that primer and liner can be produced, at least in part, with equal starting components, whereby the manufacturing costs of the measuring tube, especially the procurement, inventory and logistical costs for the starting components of liner and primer, and, as a result, also the manufacturing costs of the in-line measuring device, can, as a whole, be reduced.

BRIEF DESCRIPTION OF THE DRAWINGS

The invention and advantageous embodiments are described in further detail in the following on the basis of the figures of the drawing. Equal components are provided with equal reference characters. If it is required for purposes of clarity, however, reference characters are omitted in subsequent figures.

DETAILED DESCRIPTION OF EXEMPLARY EMBODIMENTS

Figure 1:
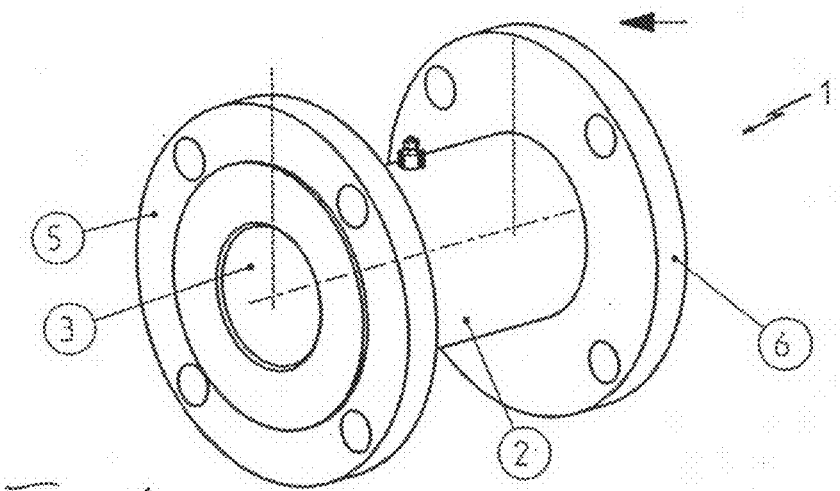
FIG. 1 shows a measuring tube for an, especially magneto-inductive, in-line measuring device, perspectively in side view.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Figure 2:
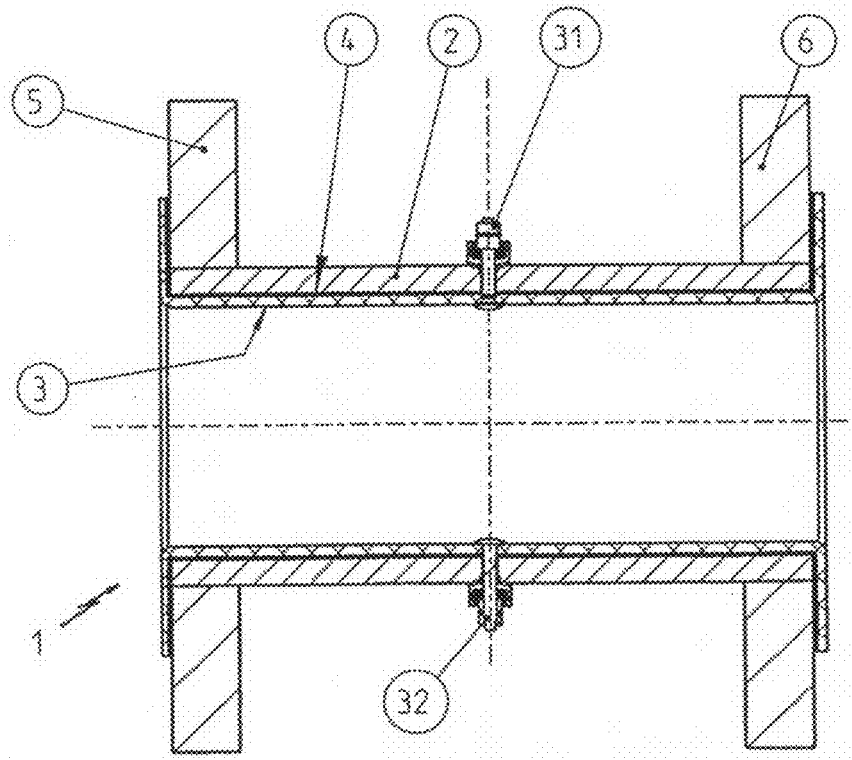
FIG. 2 shows the measuring tube of FIG. 1 in longitudinal section.

FIGS. 1 and 2 show, in different views, a measuring tube 1 for a measuring transducer of an in-line measuring device, which serves for measuring, for example, the flow velocity and/or volume flow rate of a fluid flowing in a pipeline (not shown). The in-line measuring device can be, for example, a flow measuring device measuring magneto-inductively, or a flow measuring device measuring acoustically on the basis of ultrasound. Especially, the in-line measuring device is intended to be used in drinking water distribution networks.

Measuring tube 1 is composed of an, especially metal, support tube 2 of predeterminable lumen and a tubular liner 3 having a predeterminable diameter and made of an insulating material. Support tube 2 is composed of a non-ferromagnetic material, for example stainless steel or another rust-free metal, and surrounds the liner 3 coaxially. The liner completely lines the support tube 2, and, in this respect, essentially completely isolates the support tube 2 from fluid flowing through during operation.

The liner 3 of the in-line measuring device of the invention is composed, at least in part, of a polyurethane ($PUR_3$). For facilitating adherence of liner 3 to support tube 2, a primer 4, likewise at least in part of a polyurethane ($PUR_4$), is provided therebetween. Primer 4 can, for instance, be applied by spraying or painted with a brush or other applicator in a liquid state as a thin layer to the inner wall of the support tube 2 during manufacture of the measuring tube. After the polyurethane ($PUR_4$) forming the primer 4 has been allowed to cure, at least partially, at least to a degree sufficient for the subsequent processing, on the inner wall of the support tube 2, then the actual liner 3 can be manufactured, for example, by applying flowable polyurethane ($PUR_3$) in a centrifugal process or in a so-called ribbon-flow process to the inner wall of the support tube 2 and distributing such there in a surface-covering manner, as uniformly as possible.

In an embodiment of the invention, it is provided that, used for the manufacture of the liner 3, is a polyurethane which is different from the polyurethane used for primer 4. Alternatively thereto, especially for the case in which liner 3 and primer 4 are to exhibit essentially the same chemical properties, it is, however, also possible to use essentially equal polyurethanes for manufacture of liner and primer.

In an embodiment of the invention, the measuring tube is provided for use in an in-line measuring device having a magneto-inductive measuring transducer. Accordingly, the measuring transducer encompasses, furthermore, a magnetic circuit arranged at the measuring tube to create and convey a magnetic field inducing an electrical voltage in the flowing—in this case, electrically conductive—fluid, as well as measuring electrodes for sensing voltages induced in the flowing fluid.

The magnetic circuit arrangement usually has two field coils that, in measurement operation, are connected with an—not shown here—exciter electronics of the in-line measuring device that creates variable electrical currents of predeterminable current strength, such that the coils are, at least at times, flowed-through by a corresponding exciter current. The magnetic field created thereby passes through the fluid flowing in the measuring tube 1 at least sectionally perpendicularly to its stream direction of flow. To read the corresponding, induced, electrical voltage in the flowing fluid, the transducer has a sensor assembly arrangement attached to the measuring tube 1. The sensor arrangement includes first and second measuring electrodes 31, 32. These lie diametrically opposite one another, on a diameter of the measuring tube 1 imaginarily connecting the measuring electrodes running, or extending, perpendicularly to a diameter of the measuring tube 1 imaginarily connecting the field coils.

Of course, the measuring electrodes 31, 32 can, if required, especially in the case of more than two measuring electrodes, be arranged separately and with clearance from each other, but not diametrically opposed. This can be the case, for example, if additional measuring electrodes are provided for reference potentials or, in the case of a horizontal, installed position of the measuring tube 1, measuring electrodes are provided for monitoring a minimum level of fluid in measuring tube 1. For fluid-tight insertion into the pipeline, the measuring tube 1 has, further, a first flange 4 on a first measuring tube end and a second flange 5 on a second measuring tube end. Support tube 2 and flanges 4, 5 all have circular cross-sections.

In production of the measuring tube 1, support tube 2 is first provided with the desired length, and the metal flanges 4, 5 are prepared to fit with the support tube 2. Then, flange 4 is pushed onto one end of the support tube 2 and flange 5 onto the other end. Thereupon a rear side of each of the metal flanges 4, 5 is connected firmly and tightly with the exterior of the support tube 2. This can be done when using a metal support tube and metal flanges, for example, by soldering, brazing or welding, which leads to corresponding solder, braze, or weld seams 6. The space between the flanges 4, 5 and the support tube 2 can, as is usual especially in the case of magneto-inductive measurement pickups, be closed by means of a surrounding piece of sheet metal. The space, in the case that the measuring tube will be used for a magneto-inductive measurement pickup, can serve, for example, to accommodate the field coils producing the mentioned magnetic field and further components of the above-mentioned, magnetic circuit arrangement. If the sheet metal is to serve, in such case, as a component of the magnetic circuit, it is preferably built of ferromagnetic material.

As already indicated, the in-line measuring device serves, especially, also for measuring fluids, such as drinking water, which are subject to increased requirements as regards chemical-biological, as well as also bacteriological, purity. Consequently, it is additionally provided in the case of the measuring tube 1 of the invention, that both the polyurethane ($PUR_3$) for the liner 3 and also the polyurethane ($PUR_4$) for the primer 4 are, in each case, suited, especially also permitted, per se for application in the drinking water field. In other words, the polyurethane ($PUR_3$) for the liner 3 and the polyurethane ($PUR_4$) for the primer 4 are, in each case, so developed, that in spite of sustained contact with the fluid, especially drinking water, to be measured, at least no unallowably high, as much as possible, however, no, contamination of the fluid would be caused by ingredients contained in the liner and/or in the primer, be it, for instance, the reacted polyurethane itself or possibly unreacted residues of individual starting components, intermediate reaction products and/or reaction by-products thereof or possibly introduced metals or metal compounds possibly contained therein.

Used as materials for the liner 3 and also for the primer 4 can be, for example, a polyurethane containing aliphatic and/or aromatic, ether groups, and/or aliphatic and/or aromatic, ester groups. Additionally, the polyurethane ($PUR_3$) for the liner 3, as well as also the polyurethane ($PUR_4$) for the primer, can be formed on the basis of monomeric and/or prepolymeric and/or polymeric isocyanates, as required, also trimers (trimerizates or trimerisates) derived therefrom.

In a further embodiment of the invention, it is provided, in such case, that the polyurethane ($PUR_3$) of the liner 3 is produced on the basis of a multicomponent system formed of a first liner starting component ($A_3$) containing an isocyanate, especially diisocyanate, and a second liner starting component ($B_3$) containing a di-, or more-, valent alcohol. Alternatively or in supplementation thereof, it is further provided that the polyurethane ($PUR_4$) of the primer 4 is produced on the basis of a multicomponent system formed by means of a first primer starting component ($A_3$) containing an isocyanate, especially a diisocyanate and/or a higher-valent isocyanate, as well as a second primer starting component ($B_3$) containing a di-, or more-, valent alcohol.

In order to make liner 3 and primer 4 drinking-water suitable, in each case, in the above sense, in a further embodiment of the invention for manufacturing the polyurethane ($PUR_3$) used for the liner 3, as well as also for the manufacture of the polyurethane ($PUR_4$) used for the primer 4, among other things, in each case, use of a heavy metal containing and/or amine containing catalyst is declined, although these types of catalysts would actually be very advantageous for the proper manufacture of liner 3 and for primer 4, because of their good reactivity. Instead, in the case of the in-line measuring device of the invention, for manufacture at least of its liner 3, a polyurethane ($PUR_3$) is used, which is formed by inclusion of a catalyst ($C_3$) containing metal-organic compounds and serving, in effect, as a third liner starting component. Moreover, the polyurethane ($PUR_3$) for the liner 3 is so chosen that the metal (Me) brought into the liner with the catalyst ($C_3$) and remaining there, is bonded chemically, especially atomically, and/or physically, especially by crosslinking, to carbon chains formed in the liner. An advantage of this catalyst ($C_3$) is that its organo-metal compounds are incorporated into the material of the liner in such a manner that, even under the action of water during operation of the in-line measuring device, such are not leached out of the liner, or, if at all, then only in physiologically safe amounts and rates. In supplementation thereof, in a further development of the invention, it is provided to use, also for the primer 4, such a polyurethane ($PUR_4$) also produced with the help of a catalyst ($C_4$), likewise containing metal-organic compounds. However, in view of the fact that, in the case of manufacture of the primer 4, not necessarily the same requirements must be set as regards speed of manufacture and/or accuracy of dimensions, as must be done for liner 3, it can be possible in the manufacture of the primer 4 even to omit completely the use of a catalyst ($C_4$). However, it is clearly possible, in case required, to include for the polyurethane ($PUR_4$) of the primer 4, thus serving as a third primer starting component, an equally drinking-water-suitable catalyst ($C_4$). This can be, for example, essentially the catalyst ($C_3$) for the polyurethane ($PUR_3$) of the liner 3.

In an embodiment of the invention, the catalyst used, at least for the manufacture of the polyurethane ($PUR_3$) of the liner 3, contains organotin compounds, especially di-n-octyl tin compounds, whereby it can be assured that the tin (Sn) brought into the finished liner 3 via the catalyst and, in the end, remaining there, is itself chemically and/or physically bound in the liner 3 and is, as a result, lastingly embedded therein. In an embodiment of the invention, the following organotin compound is used as catalyst ($C_3$) for manufacture of the polyurethane ($PUR_3$) for the liner 3:

$$C_{40}H_{80}O_4Sn \qquad (1)$$

Proven to be especially advantageous as catalyst ($C_3$) for manufacture of the liner 3 is, for example, di-n-octyl tin dilaurate (DOTL), especially that with CAS No. 3648-18-8, whose structure can be represented schematically as follows:

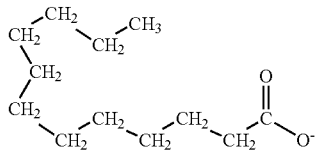

(2)

Moreover, also, for example, dioctyltin dimalinates or similar metal-organic compounds can be used as catalysts (C3) for manufacture of liner 3.

In an embodiment of the invention, at least the polyurethane (PUR$_3$) of the liner is an elastomer manufactured on the basis of a multicomponent system (A$_3$+B$_3$+C$_3$), which has been formed by means of a prepolymer as first liner starting component (A$_3$) and an alcohol, especially a di-, or more-, valent alcohol, as second liner starting component (B$_3$), as well as with use of a catalyst (C$_3$) of the aforementioned kind serving as third liner starting component.

For example, the polyurethane (PUR$_3$) for the liner can be an elastomer that, at least in part, exhibits essentially the following structure:

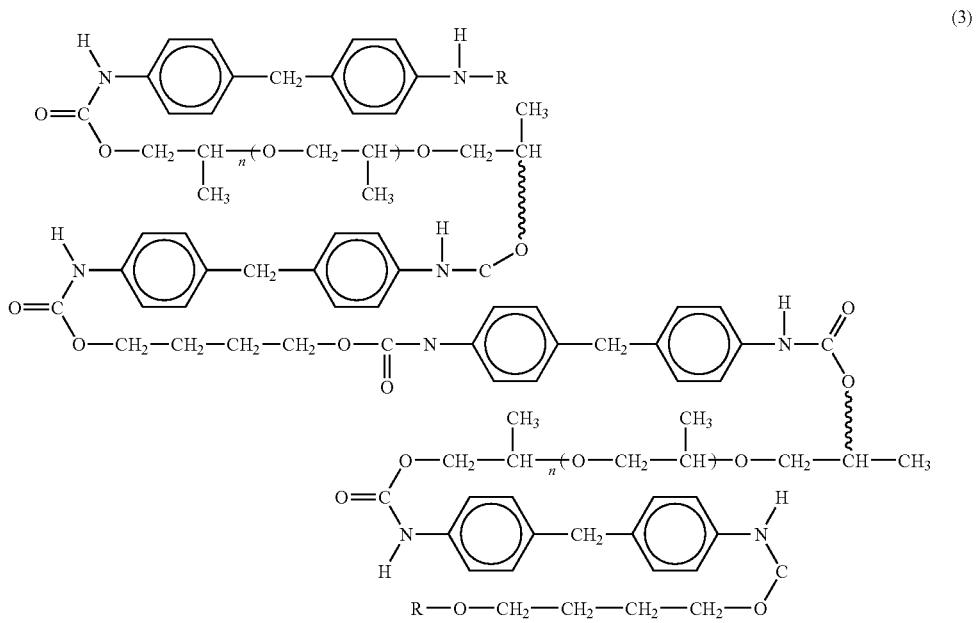

(3)

-continued

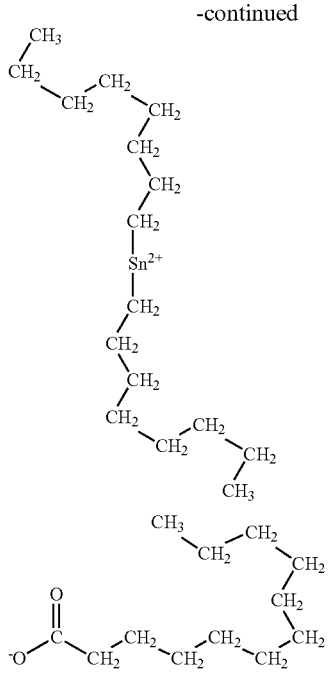

In a further embodiment of the invention, the alcohol (B$_3$) used for manufacture of the liner 3 is one having at least two functional OH-groups, for example a diol. Especially good results can be obtained, in such case, for example through use of butanediol, especially that having CAS No. 110-63-4.

In another embodiment, it is further provided to develop the alcohol for the polyurethane (PUR$_3$) of the liner 3 and/or the polyurethane (PUR$_4$) of the primer 4 as a prepolymer. Found to be advantageous in this case is, for example, the use of prepolymeric alcohol based on castor oil. In a further embodiment of the invention, the alcohol (B$_4$) at least used for the manufacture of the primer 4 is a polyester polyol, such as e.g. Baycoll® AD 1122 or Baycoll® CD 2084 of Bayer MaterialScience AG, Leverkusen, DE, and/or a polyether polyol, such as e.g. Desmophen® 1380 BT of Bayer MaterialScience AG, Leverkusen, DE, and/or an appropriately hydroxyl-groups-containing polyester, especially a branched one, such as e.g. Desmophen® 650 MPA of Bayer MaterialScience AG, Leverkusen, DE.

Additionally, prepolymers or polymers with two or more, reactive NCO-groups, especially those with aromatic isocyanates, have proven to be especially advantageous for the manufacture of the liner 3, as well as also the primer 4. Alternatively or in supplementation thereof, it is, however, also possible to use corresponding isocyanate monomers or also prepolymers or polymers based on aliphatic, as required also cycloaliphatic, isocyanate groups for manufacture of the polyurethane (PUR$_3$) of the liner 3 and/or the polyurethane (PUR$_4$) of the primer 4.

In another embodiment of the invention, at least the first liner starting component ($A_3$) used for manufacture of the liner 3 is formed by means of a prepolymer, which is, at least in part, built on the basis of the following structural formula:

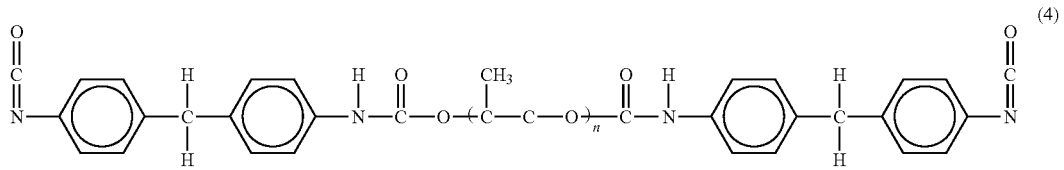

(4)

For producing such a prepolymer, in a further development of the invention, a polypropylene oxide is used, which is allowed to react with an aromatic and/or aliphatic diisocyanate, especially such added in excess. In another embodiment of the invention, the polypropylene oxide, at least for the liner 3, is a polypropylene glycol (PPG), whose simplified structure can be described about as follows:

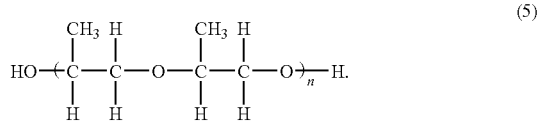

(5)

Alternatively or in supplementation to polypropylene oxide, also a polytetramethylene-ether-glycol (PTMEG) of the following structural formula can, for example, serve for the manufacture at least of the prepolymer ($A_3$) for the liner 3:

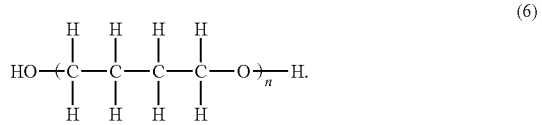

(6)

Moreover, alternatively or in supplementation, it is also possible to use other aliphatically constructed glycol compounds containing polymeric ether groups and terminal OH-groups for manufacture of the prepolymer serving as liner starting component ($A_3$) or, however, also for manufacture of the prepolymer serving as primer starting component ($A_4$).

In another embodiment of the invention, the diisocyanate used for manufacture of the polyurethane ($PUR_3$) for the liner 3 and/or for manufacture of the polyurethane ($PUR_4$) for the primer 4 is one based on an aromatic diphenylmethane diisocyanate (MDI), especially according to CAS No. 101-68-8 and having at least one of the following isomeric structures:

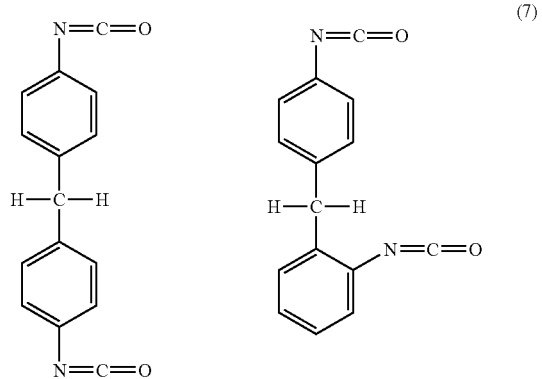

(7)

-continued

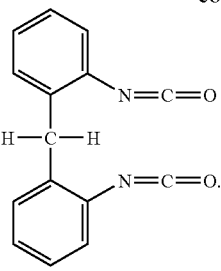

Monomeric isocyanates, especially those based on diphenylmethane diisocyanate, are available, for example, as Desmodur® 44 M or Desmodur® 2460 M from Bayer MaterialScience AG, Leverkusen, DE. Alternatively to or in supplementation of the monomeric diisocyanates, it is possible, however, also to use their homologs and/or also corresponding prepolymers, as required also polymers based on such diisocyanates, for the manufacture of the polyurethane ($PUR_3$) for the liner 3 and/or for manufacture of the polyurethane ($PUR_4$) for the primer 4, especially with the following structure:

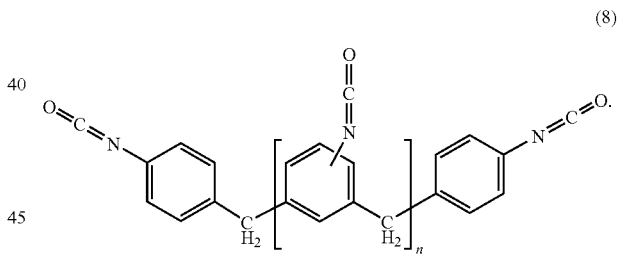

(8)

Prepolymers of the aforementioned type based on diphenylmethane diisocyanate (MDI) are available, for example, as Desmodur® E 23 from Bayer MaterialScience AG, Leverkusen, DE.

Alternatively or in supplementation thereto, it is, however, also possible to use a prepolymer and/or a polymer based on aromatic toluene diisocyanate (TDI, CAS No. 584-84-9),

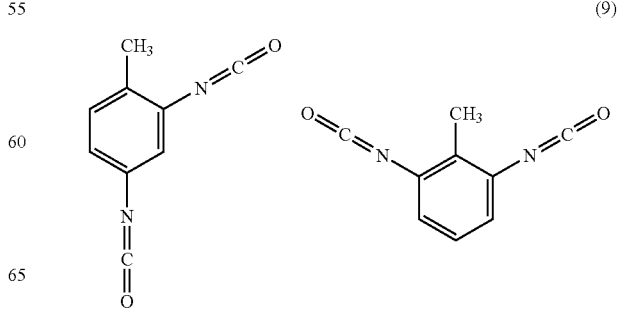

(9)

such as e.g. Desmodur® L 67 MPA/X or Desmodur® L 75 of Bayer MaterialScience AG, Leverkusen, DE, for at least one of the polyurethanes ($PUR_3$), ($PUR_4$) for the manufacture of the measuring tube, at least to the extent that the toluene diisocyanate is permitted for applications in the drinking water field.

Additionally, however, it is also possible to apply for the manufacture of the liner 3 and/or the primer 4 a prepolymer and/or a polymer based on an aliphatic hexane diisocyanate (HDI, CAS No. 822-06-0), especially also allowable for applications in the drinking water field, of structure

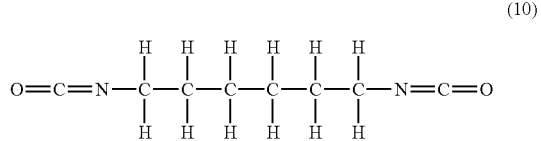 [SMILES: O=C=NCCCCCCN=C=O]

(10)

and/or based on an aliphatic isophorone diisocyanate (IPDI, CAS No. 4098-71-9), especially also allowable for applications in the drinking water field, of structure

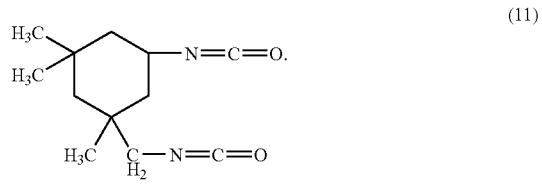 [SMILES: CC1(C)CC(N=C=O)CC(C)(CN=C=O)C1]

(11)

An isophorone diisocyanate suitable in the above sense is e.g. the IPDI-trimer Desmodur® Z 4470 MPA/X of Bayer MaterialScience AG, Leverkusen, DE, while a successful example of hexane diisocyanate is provided by the HDI-trimer Desmodur® N 3300 of Bayer MaterialScience AG, Leverkusen, DE.

Additionally, also other homologs and/or isomers of the aforementioned diisocyanates can be used for producing the polyurethane ($PUR_3$) of the liner 3 and/or the polyurethane ($PUR_4$) of the primer 4. Alternatively or in supplementation thereto, the polyurethane ($PUR_3$) of the liner 3 and/or the polyurethane ($PUR_4$) of the primer 4 can be formed on the basis of aromatic and/or aliphatic, monomeric diisocyanates, especially monomeric MDI, HDI, IPDI and/or TDI. Moreover, it has been found to be advantageous, at least for manufacture of the primer 4, to produce the polyurethane ($PUR_4$) using a mixture of monomeric and homologous diisocyanate, for example one according to CAS No. 9016-87-9 based on diphenylmethane diisocyanate (MDI).

In a further development of the invention, for producing the primer 4, first, a flowable, especially sprayable and/or brushable, first multicomponent system ($A_4+B_4$) is formed, which contains the isocyanate ($A_4$), for example, in the form of diisocyanate, according to one of the aforementioned configurations, as well as di-, or more-, valent alcohol ($B_4$). If required, the first multicomponent system can, for accelerating the manufacturing process, be provided also with one of the aforementioned catalysts ($C_4$), especially one suitable for drinking-water applications. Once the first multicomponent system has been prepared, it is applied, for example painted or sprayed, onto an internal wall of the support tube, especially a metal support tube, serving as foundation of the measuring tube, and there allowed to cure, at least partially, for forming the primer 4 secured to the support tube 2. In an embodiment of the method, the first multicomponent system ($A_4+B_4$) is so applied to the inner wall of the support tube 2, taking into consideration possible volume changes, such that the primer 4 ends with a thickness of less than 500 μm, especially less than 300 μm.

For manufacturing the polyurethane ($PUR_3$) for the liner 3, additionally, the second multicomponent system ($A_3+B_3+C_3$) containing isocyanate ($A_3$), especially diisocyanate, di-, or more-, valent alcohol ($B_3$), and a catalyst ($C_3$) is mixed. After the first-formed primer 4 has cured sufficiently on the inner wall of the support tube 2, the first still flowable, second multicomponent system is applied onto the primer 4 formed on the inner wall of the support tube 2 and then allowed to cure quickly based on the effect of the catalyst ($C_3$), whereby, finally, the liner 3 is formed in-situ.

The second multicomponent system ($A_3+B_3+C_3$) can be applied, for example, in the so-called ribbon-flow process using a flow or spray head, which can travel within the lumen of the support tube 2, onto the primer 4 already adhered to the inner wall of the support tube 2. By simultaneous rotating of the support tube 2 about its longitudinal axis and traveling of the flow or spray head essentially parallel to the longitudinal axis, the liquid, multicomponent system ($A_3+B_3+C_3$) can be distributed in very simple and well reproducible manner uniformly over the entire inner wall.

In an advantageous embodiment of the invention, concentration and amount of the added catalyst ($C_3$) are so selected, that the multicomponent system ($A_3+B_3+C_3$) applied to the support tube 2 equipped with primer 4 can cure within a comparatively short reaction time of less than one minute, especially under 30 seconds, and at a working temperature of less than 100° C., for example 25° C. Experimental investigations have, in such case, shown, for example, that, especially in the case of use of the above-described prepolymer systems (PPG+MDI and/or PTMEG+MDI), such short reaction times can be achieved by addition of the catalyst ($C_3$) at a mass fraction of less than 2% of the total mass of the multicomponent system ($A_3+B_3+C_3$). Further-going investigations have additionally shown that especially good results can be achieved in the case of manufacture of the liner 3, when alcohol ($B_3$) and prepolymer ($A_3$) for the polyurethane ($PUR_3$) of the liner 3 are added in a mixing ratio B:A of about 15:100 or less, especially a mixing ratio B:A of less than 10:100. Methods especially suited for manufacture of the polyurethane ($PUR_3$) for the liner 3, and, as a result, also for its manufacture, especially also for metering of the catalyst, are, moreover, described, for example, in the non-prepublished patent applications DE 102005044972.7 and U.S. 60/718,308.

In case required, multicomponent systems used for manufacture of the polyurethane ($PUR_3$) for the liner 3 and/or the polyurethane ($PUR_4$) for the primer 4 can be extended by means of one or more, suitable, especially color-giving and/or strengthening, fillers. The filler can be, for example, a reactive colorant or a pigment e.g. containing, or derived from, carbon particles. Thus, for example, use of black pigment, for example PRINTEX® F 80 of the firm Degussa AG, Düsseldorf, DE, has proven to be very advantageous for manufacture of liners of the described kind, especially also liners which are suitable for drinking-water applications. However, also use of the reactive colorant Reactint® Black X95AB has been found to be very successful, such as is currently offered for the coloring of polyurethanes by the firm Milliken Chemical, a subsidiary of Milliken & Company, Spartanburg, S.C. Alternatively to or in supplementation of the aforementioned coloring materials, also carbonates, especially calcium carbonate, silicates, such as e.g. talc, clay and/or glimmer, siliceous earth, calcium- and barium-sulfate, aluminum hydroxide, glass fibers and spheres, as well as wood dust and cellulose, can be used for manufacture of the polyurethane ($PUR_3$) for the liner 3 and/or the polyurethane ($PUR_4$) for the primer 4. By suitable selection of such, especially equally drinking-water suitable, fillers as regards composition and/or particle size, additionally, as required, also a further improvement of the chemical-biological and/or mechanical properties, e.g. strength or surface hardness, etc. of the respective polyurethanes ($PUR_3$), ($PUR_4$) can be achieved.

By using polyurethanes ($PUR_3$) of the above-described kind as material for the liner 3, the measuring tube 1 can be manufactured, without more, with nominal diameters in the range between 25 mm and 2000 mm. Equally, consequently, especially using the above-described, ribbon-flow method for the manufacture of the liner 3, it can be assured that the liner 3 displays a thickness, as uniform as possible, of less than 8 mm, especially less than 4 mm.

A further advantage of the in-line measuring device of the invention is that, by using a polyurethane ($PUR_3$) of the above-described kind for the liner 3 and a polyurethane ($PUR_4$) of the above-described kind for the primer 4, even the requirements posed for applications in the drinking-water field, especially the, also as compared to other foods applications, very high hygienic requirements, can be fulfilled. Investigations has shown, for example, that the migration rate ($M_{max,\ TOC}$) as regards total organic carbon content (TOC) can lie below 0.25 milligrams per liter and day, while, for the chlorine consumption rate ($M_{max,\ Cl}$), it is quite possible to achieve values of less than 0.2 milligrams per liter and day. As a result, the in-line measuring device of the invention can meet, for example, the requirements established in the "Leitlinie zur hygienischen Beurteilung von Epoxidharzbeschichtungen in Kontakt mit Trinkwasser" (translation: "Guideline for hygienic evaluation of epoxy resin coatings in contact with drinking water") relevant at least for Germany for equipment in the distribution network, especially also in main lines, and/or the NSF/ANSI Standard 61 relevant at least for the USA for drinking-water system components. Equally, the in-line measuring device can thoroughly meet also the requirements of the test specifications for permitting for drinking-water applications for Great Briton, "Water Regulation Advisory Scheme BS 9620" and/or for France, "Dossier de Demande d'Acs pour Accesoires". In-line measuring devices of the invention with a liner of polyurethane can, thus, be used quite conventionally in the drinking water field or replace in-line measuring devices of the described kind having relatively expensive liners of PFA, PTFE, hard rubber or the like provided therefor.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method for manufacturing a measuring tube of an in-line measuring device, wherein the measuring tube includes a support tube, and a liner internally lining the support tube, said method comprising:

forming a flowable first multicomponent system, which contains isocyanate, a di-, or more-, valent alcohol and a catalyst;

applying the first multicomponent system onto an inner wall of the support tube, serving as a component of the measuring tube;

allowing at least parts of the first multicomponent system to cure on the inner wall of the support tube for forming a primer adhering to the support tube;

forming a flowable, second multicomponent system, which contains isocyanate, a di-, or more-, valent alcohol, and a catalyst;

applying the second multicomponent system onto the primer formed on the inner wall of the support tube; and allowing the second multicomponent system to cure in the support tube for forming the liner, wherein:

both the catalyst of the first multicomponent system and the catalyst of the second multicomponent system contain metal-organic compounds.

2. The method as claimed in claim 1, wherein:
the catalyst of the second multicomponent system comprises a di-n-octyl tin dilaurate and/or a di-n-octyl tin dimalinate.

3. The method as claimed in claim 1, wherein:
the first multicomponent system contains diisocyanate; and/or
the second multicomponent system contains diisocyanate.

4. The method as claimed in claim 1, wherein:
the prepolymer of the first multicomponent system contains at least two reactive NCO groups; and/or
the prepolymer of the second multicomponent system contains at least two reactive NCO groups; and/or
the prepolymer of the first multicomponent system contains aromatic and/or aliphatic, isocyanate groups; and/or
the prepolymer of the second multicomponent system contains aromatic and/or aliphatic, isocyanate groups; and/or
the first second multicomponent system contains monomeric and/or prepolymeric and/or polymeric isocyanate; and/or
the second multicomponent system contains monomeric and/or prepolymeric and/or polymeric isocyanate; and/or
the first multicomponent system is formed using a prepolymer based on diisocyanate; and/or
the second multicomponent system is formed using a prepolymer based on diisocyanate.

5. The method as claimed in claim 1, wherein:
prepolymer of the first multicomponent system is based on at least on of diphenylmethane diisocyanate (MDI), hexane diisocyanate (HDI), toluene diisocyanate (TDI) and isophorone diisocyanate (IPDI); and/or
prepolymer of the second multicomponent system is based on at least on of diphenylmethane diisocyanate (MDI), hexane diisocyanate (HDI), toluene diisocyanate (TDI) and isophorone diisocyanate (IPDI).

6. The method as claimed in claim 1, wherein:
the catalyst of the second multicomponent system contains metal-organic compounds formed of a physiologically safe metal.

7. The method as claimed in claim 1, wherein:
the catalyst of the second multicomponent system contains metal-organic compounds selected from a group consisting of organotin compounds.

8. The method as claimed in claim 1, wherein:
the first multicomponent system contains ether groups; and/or
the second multicomponent system contains ether groups; and/or the first multicomponent system contains ester groups; and/or the second multicomponent system contains ester groups; and/or the alcohol of the first multicomponent system comprises a diol; and/or the alcohol of the second multicomponent system comprises a diol; and/or the alcohol of the first multicomponent system comprises a prepolymer based on castor oil; and/or the alcohol of the second multicomponent system comprises a prepolymer based on castor oil; and/or also the first multicomponent system also contains a catalyst.

9. The method as claimed in claim 8, wherein:

the first multicomponent system contains aliphatic ether groups; and/or the second multicomponent system contains aliphatic ether groups; and/or the first multicomponent system contains aromatic ether groups; and/or the second multicomponent system contains aromatic ether groups; and/or the first multicomponent system contains aliphatic ester groups; and/or the second multicomponent system contains aliphatic ester groups; and/or the first multicomponent system contains aromatic ester groups; and/or the second multicomponent system contains aromatic ester groups; and/or the alcohol of the first multicomponent system comprises a butanediol; and/or the alcohol of the second multicomponent system comprises a butanediol.

10. The method as claimed in claim 1, wherein:

the catalyst of the first multicomponent system contains metal-organic compounds formed of a physiologically safe metal; and/or wherein: the catalyst of the first multicomponent system contains organotin compounds.

11. The method as claimed in claim 10, wherein:

the catalyst of the first multicomponent system contains di-n-octyl tin compounds.

12. The method as claimed in claim 1, further comprising:

performing at a working temperature of less than 100° C. each of the following:

forming the flowable first multicomponent system;

applying the first multicomponent system onto an inner wall of the support tube;

allowing at least parts of the first multicomponent system to cure on the inner wall of the support tube;

forming the flowable for forming a primer adhering to the support tube, second multicomponent system; and applying the second multicomponent system onto the primer formed on the inner wall of the support tube and allowing the second multicomponent system to cure in the support tube for forming the liner.

13. The method as claimed in claim 12, further comprising:

performing at a working temperature at about 25° C. each of the following:

forming the flowable first multicomponent system;

applying the first multicomponent system onto an inner wall of the support tube;

allowing at least parts of the first multicomponent system to cure on the inner wall of the support tube;

forming the flowable for forming a primer adhering to the support tube, second multicomponent system; and applying the second multicomponent system onto the primer formed on the inner wall of the support tube and allowing the second multicomponent system to cure in the support tube for forming the liner.

14. The method as claimed in claim 1, wherein the support tube is a metal tube.

15. The method as claimed in claim 1, wherein first multicomponent system is sprayable and/or brushable.

* * * * *